United States Patent Office 3,423,148
Patented Jan. 21, 1969

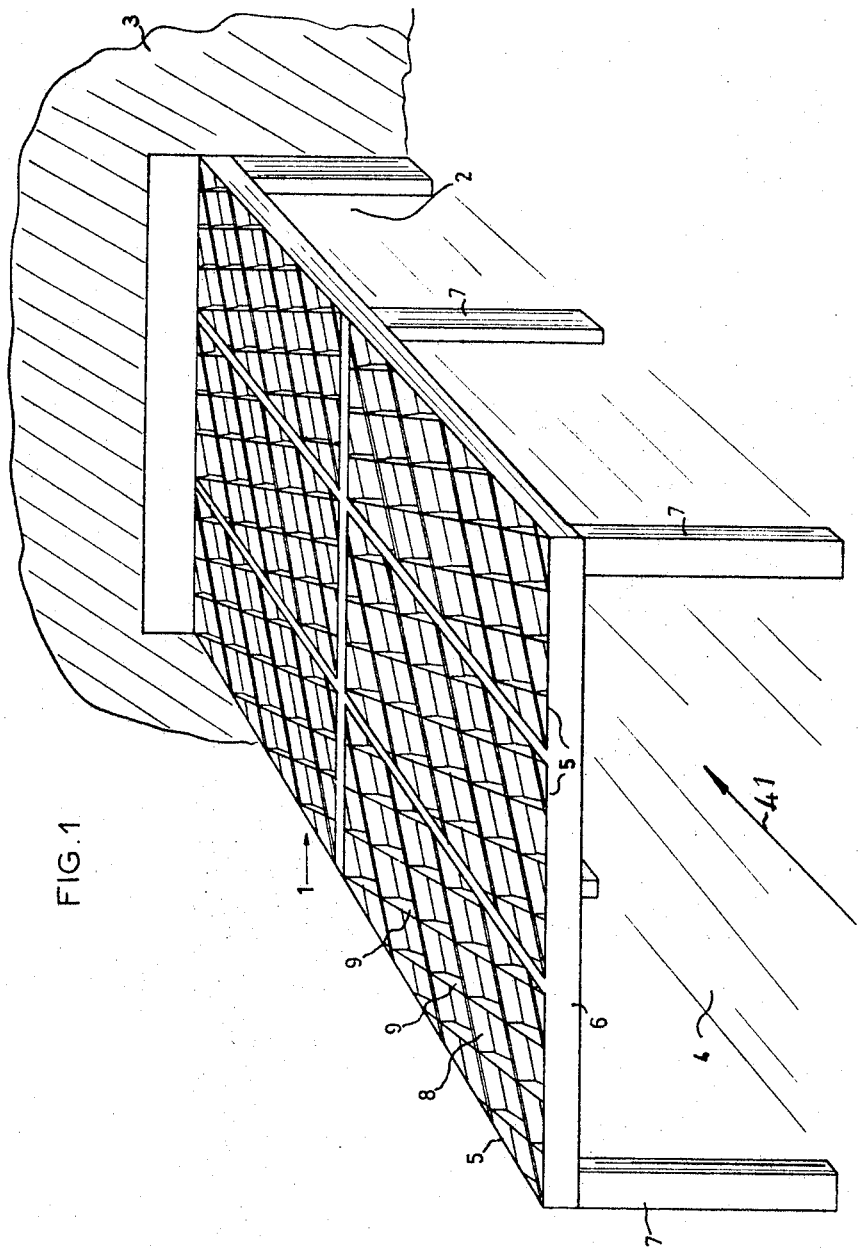

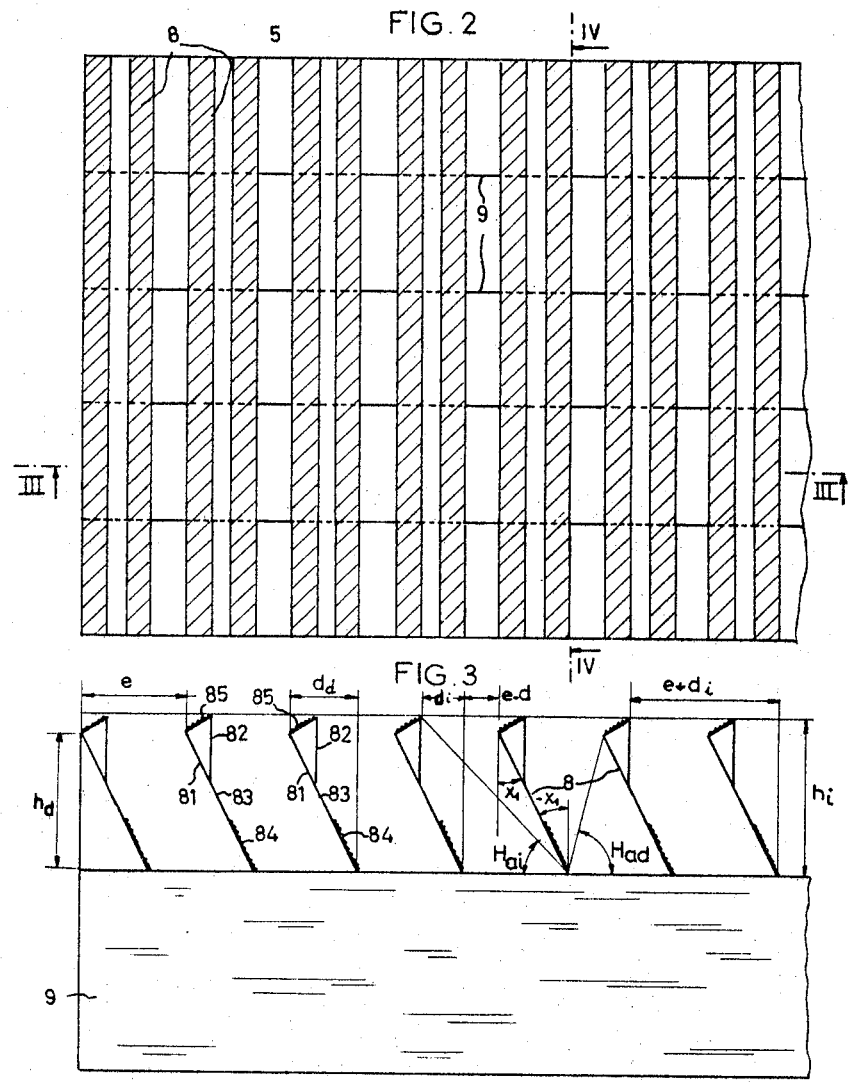

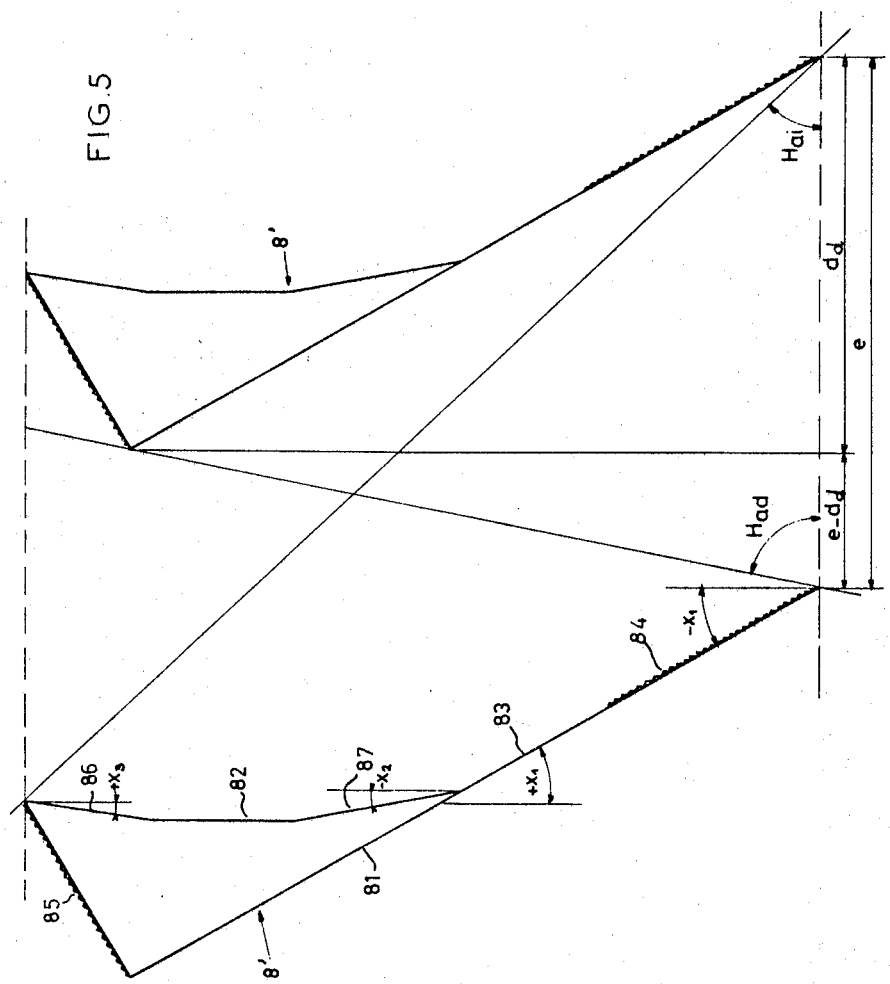

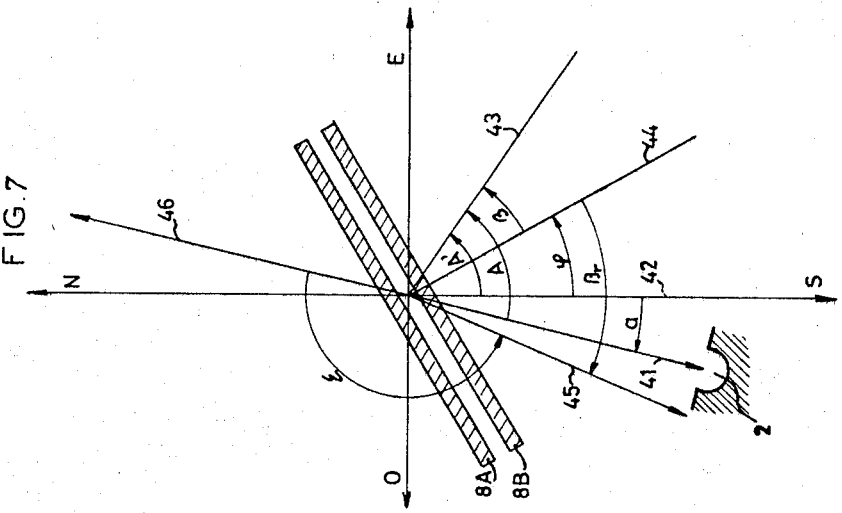
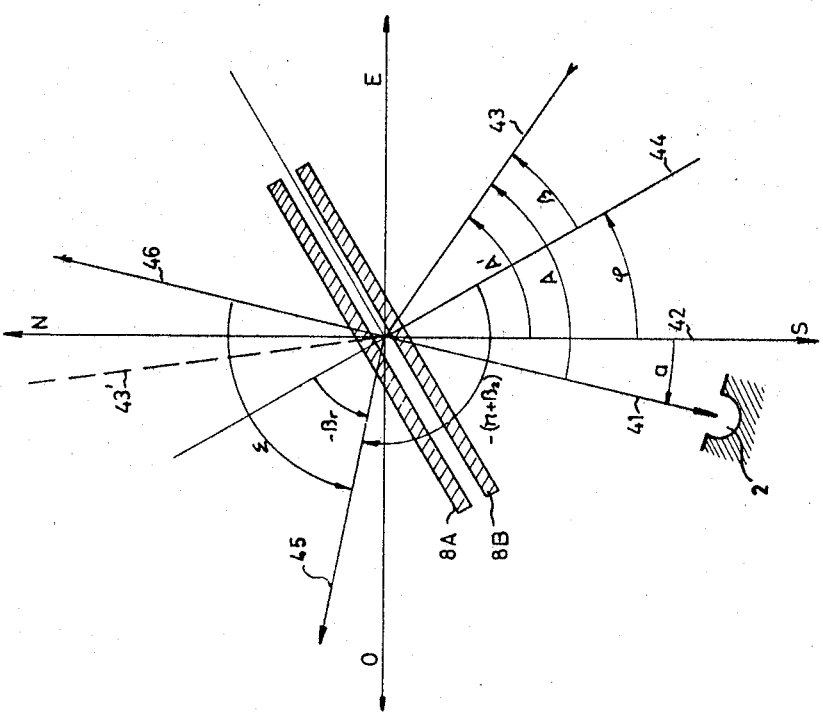

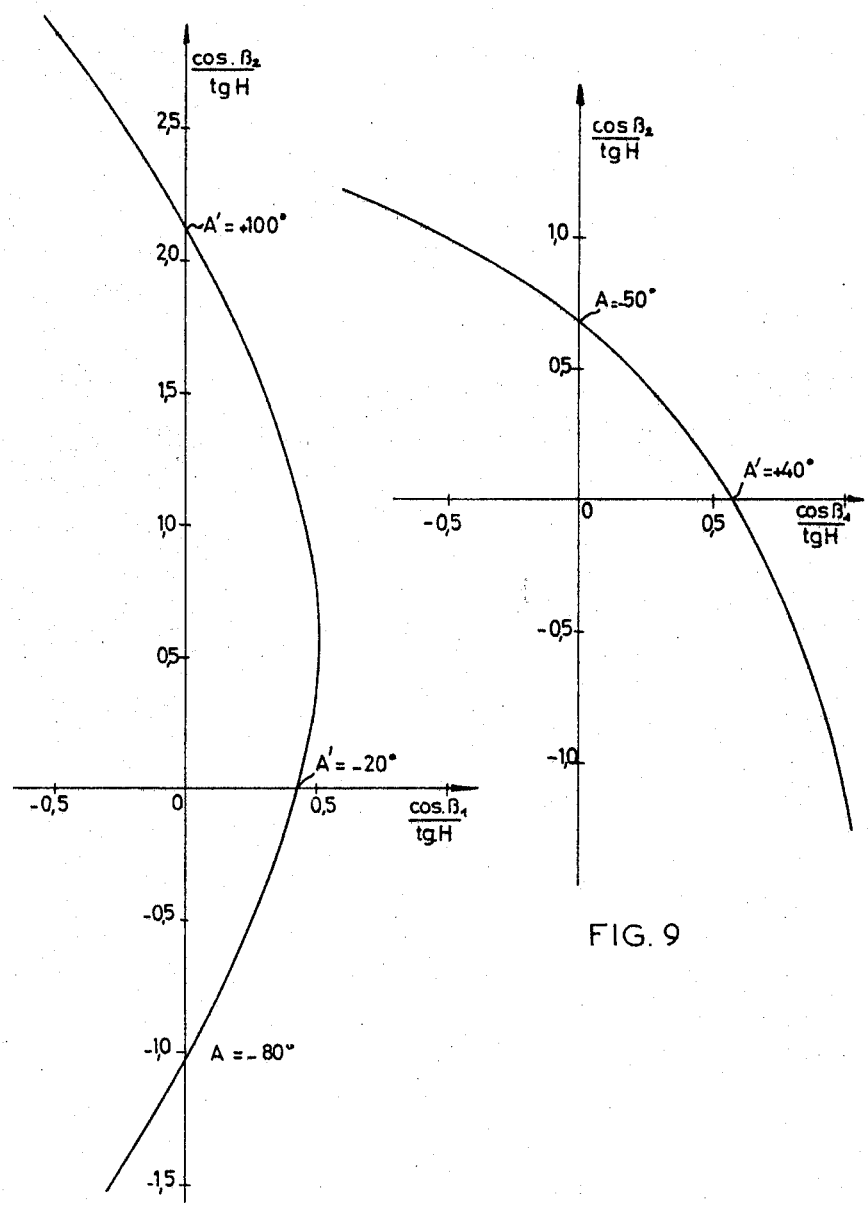

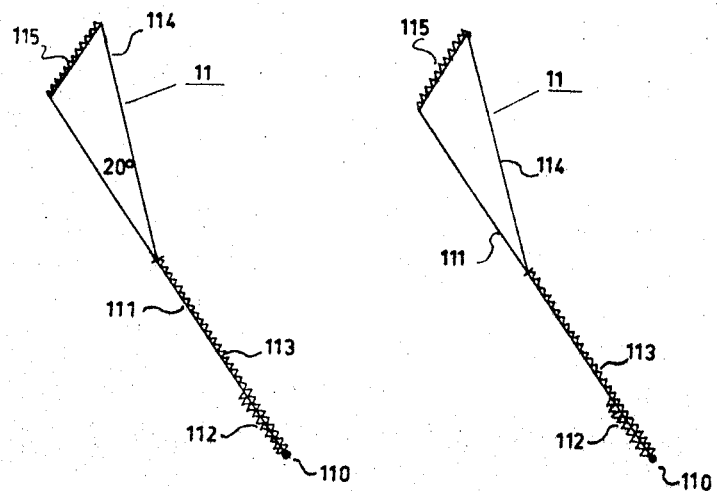
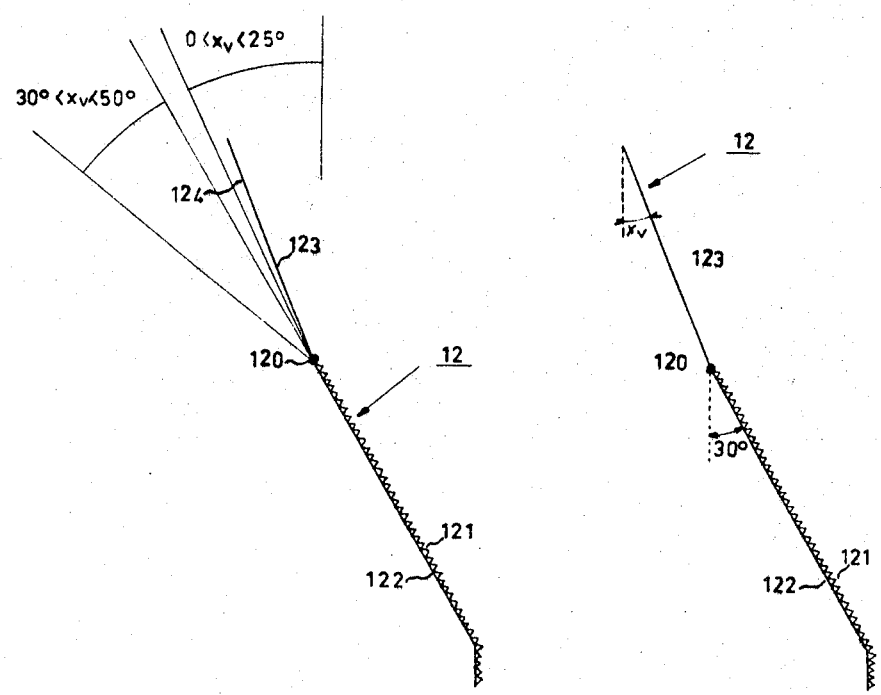

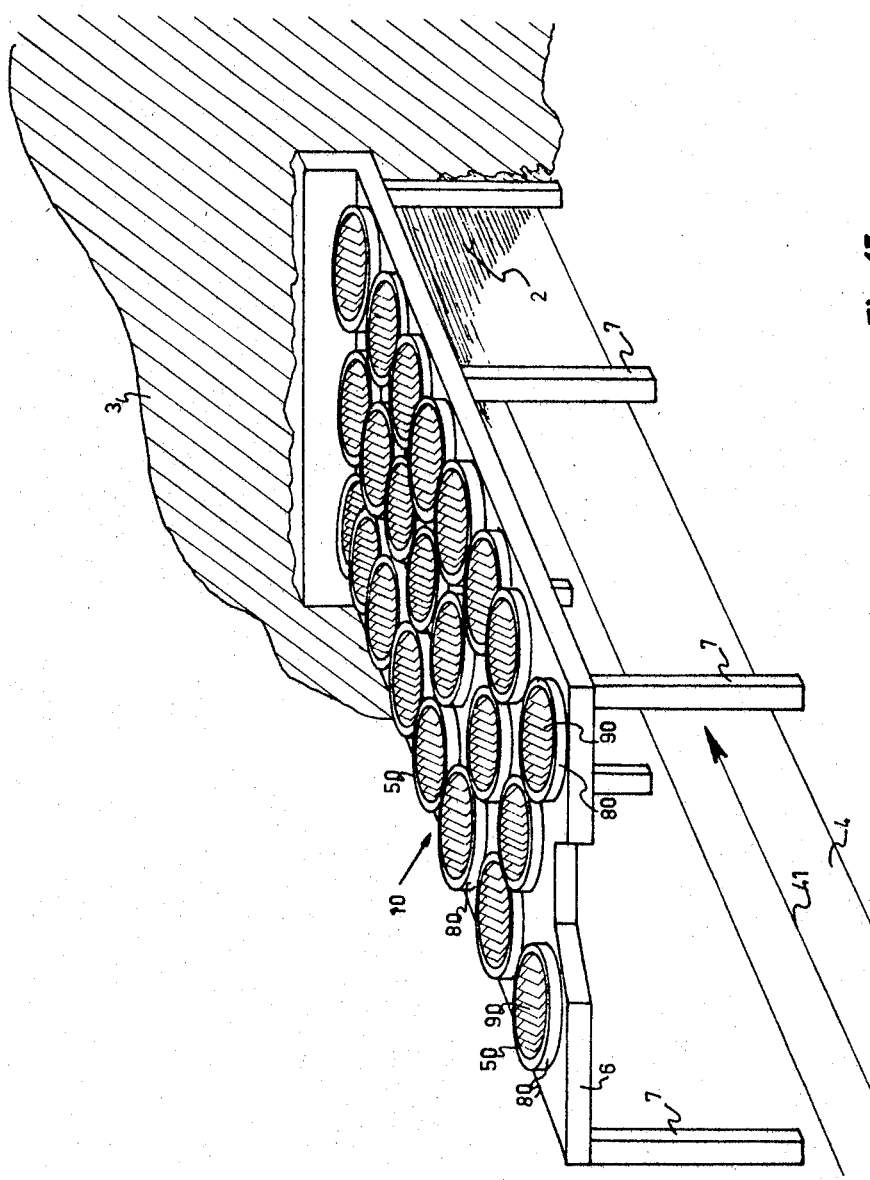

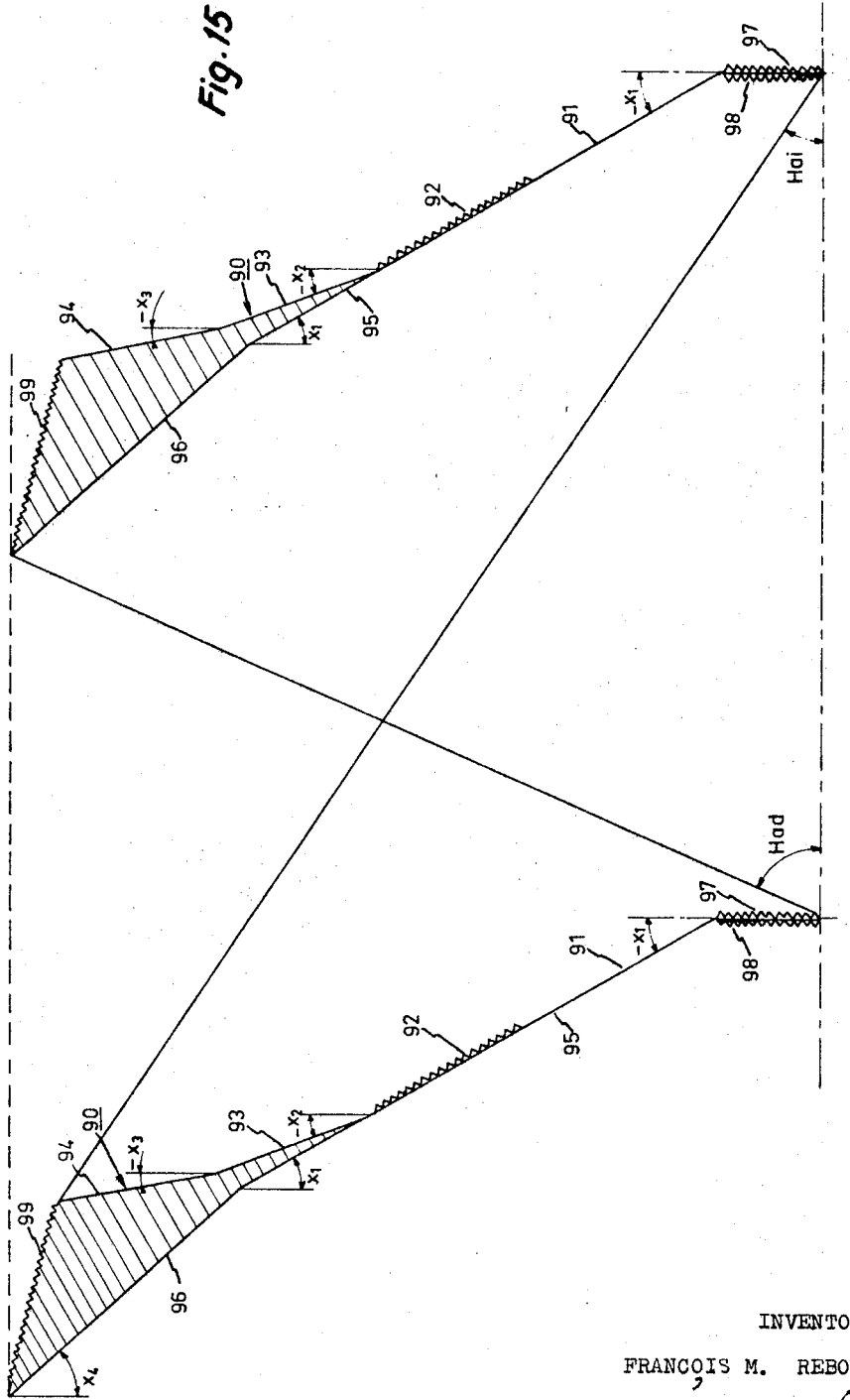

3,423,148
NATURAL LIGHT REGENERATING
GLARE-SHIELDS
François M. Reboul, 65 Blvd. de Picpus, Paris, France
Filed Aug. 11, 1966, Ser. No. 571,780
Claims priority, application France, Aug. 11, 1965,
27,941
U.S. Cl. 350—264                                    4 Claims
Int. Cl. G02b 17/00

The present invention relates to glare-shields, i.e. devices whose object it is to create, at the entrance of dark or artificially illuminated passageways such as road tunnels or underpasses open to automotive circulation, a transition zone allowing an observer travelling towards and penetrating into said passageway to distinguish, on the one hand, any obstacle located within this zone while his eye is being exposed to strong exterior luminances, and to become accustomed, on the other hand, to a change in illumination as he is travelling through it.

Fixed glare-shields are already known in the prior art consisting of two secant systems of plane parallel blades, which are vertical or inclined and made of a material which does not reflect light and which are sufficiently close to each other to insure occultation of the sun at the summer solstice, and consequently at all seasons. The relatively narrow and deep compartments marked off by these blades receive a lesser quantity of light from the sky as the sun is lower so that their efficiency is lower as the risks of dazzling are greater.

The general object of the invention is to improve safety during entrance of underpasses and road tunnels.

More particularly the object of the invention is to provide glare-shields using, to the best possible advantage, natural available light particularly in the case of a low sun.

A characteristic of the glare-shields, according to the invention, consists of at least a system of nonplanar parallel blades which, at least, are partially reflecting.

A further characteristic of the glare-shields, according to the invention, is the failure to produce any reflection of light in the direction of positive sights which makes it possible to place them in the proximity of airfields.

According to a first embodiment of the invention a fixed glare-shield is provided with two systems of parallel blades having different orientations and fixed inclinations.

According to a second embodiment of the invention a glare-shield is provided with two systems of parallel blades having different orientations one of which, at least, consists of nonplanar blades of variable inclinations.

According to a third embodiment of the invention a glare-shield is provided with rotating adjacent elements with vertical rotation axes each of which comprises only one system of nonplanar parallel blades with fixed or variable inclinations.

The features and advantages of the invention will appear more fully and clearly from the following description of exemplary embodiments thereof taken in connection with the appended drawings in which:

FIG. 1 is a diagram showing, in perspective, the general disposition of a fixed glare-shield according to the invention;

FIG. 2 is a partial plan view, of a fixed glare-shield element according to a very simple embodiment of the invention;

FIG. 3 is a sectional view along line III—III of the glare-shield element of FIG. 2;

FIG. 4 is a sectional view along line IV—IV of the glare-shield element of FIG. 2;

FIG. 5 is a sectional view, through a vertical plane perpendicular to their generatrices, of two blades of a fixed glare-shield according to a preferred embodiment of the invention;

FIGS. 6 and 7 are explanatory diagrams relating to two modes of operation of glare-shields according to the invention;

FIGS. 8 and 9 are examples of characteristic occultation curves of a fixed glare-shield comprising a two blade system of the type shown in FIG. 2;

FIGS. 11 and 12 show in cross-sectional view, through a vertical plane two examples of variable inclination blades according to the invention;

FIG. 13 is a schematic view in perspective of a rotating glare-shield according to the invention;

FIG. 15 is a cross sectional view, through a vertical plane, of two blades of a rotating element according to the invention;

Figure 10:
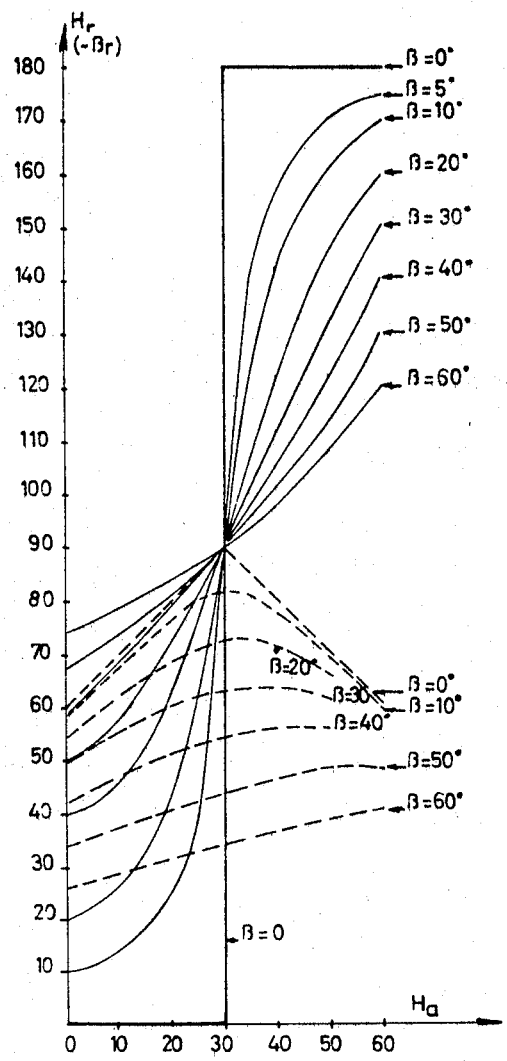
FIG. 10 is an example of a nomogram giving the directions of rays reflected by a system of nonplanar parallel blades according to the invention.

FIG. 1 is a diagram showing the principle of a fixed glare-shield 1 for entrance into a tunnel 2 going through a mountain 3 and whose access road 4 may be horizontal or inclined. Glare-shield 1 consists of two sets of fixed parallel blades 8 and 9 each having a given orientation, and is advantageously divided, for ease of construction, into a plurality of elements 5 placed side by side on a hopper 6, covering the roadway as well as its roadsides at a convenient height starting from the entrance of the tunnel up to a sufficient distance from the latter, which is supported, for example, by poles 7 planted in the roadsides and between which may be placed, on either side of the road, shutters or venetian blinds which are not shown, for screening the light.

Such a theoretical disposition is of course, simply given by way of example and it is understood that each glare-shield must be designed in relation to local conditions and that in particular its mode of fixation must be chosen so as to use to the best possible advantage the facilities afforded by the site.

When the access road 4 is a slope, elements 5 may be placed either horizontally on a hopper 6 in the form of a stairway or in a slope on a plane hopper of the same or similar inclination as the roadway. In this last case, the inclination of the set of blades must be taken into consideration for the calculation of their construction parameters.

FIGS. 2–4 show respectively a plan view and a view of 2 sections perpendicular to blades 8 and blades 9 of an element 5 of the glare-shield in FIG. 1. In the latter the sets of blades are shown as secants and in oblique directions with respect to the frame of elements 5 and in FIGS. 2–4 the sets of blades are shown as being superimposed and parallel to the sides of frame 5 in order to facilitate, as a first approximation, the definition of the characteristic parameters whose function it is to determine the operation of the glare-shields, but it must be understood that this latter disposition constitutes a particular case which could not in any way be considered as restrictive.

Blades 8 which may, for example, be oriented in a direction perpendicular to the axis of the roadway are composite blades whose inferior face is a plane-diffusing surface 81 inclined with respect to the vertical at an angle $x_1$ and whose superior face comprises, from top to bottom, a semireflecting vertical surface 82 and an inclined surface divided into 2 strips one of which 83 is diffusing and the other 84 is absorbing, i.e., giving no light reflection whatsoever. The interval between the superior edges of the inferior 81 and vertical 82 surfaces of blade 8 is masked by an absorbing surface 85. By convention, angles $x$, defining the inclination of the blade surfaces, are considered as negative between the superior face of the blade and the vertical, and as positive between the inferior face of the blade and the vertical. According to said convention, the inclination of the strips 83, 84 with respect to the vertical is $-x_1$.

Blades 9 may, for example, be plane blades with vertical diffusing surfaces parallel to the axis of the roadway.

For each set of blades, the limiting values of the apparent height of the sun with respect to the system of blades, i.e., the angle of the projection of the height of the sun on a vertical plane which is perpendicular to the blades for which there is occultation of its rays, is defined as a function of projections $h_d$, $h_i$ and $d_d$, $d_i$ of the cross-sectional dimensions of the blades on a vertical axis and on a horizontal axis as well as a function of their separation $e$. These limiting values are $$H_{ad} = \text{arc } tg \frac{h_d}{e - d_d}$$

in the case of so-called direct operation in which the sun rays first reach the superior face of the blades, and on the other hand $$H_{ai} = \text{arc } tg \frac{h_i}{e + d_i}$$

in the case of so-called reverse operation in which it is the inferior face of the blades which is directly illuminated.

It can be seen that with plane vertical blades such as 9 angles $H_{ad}$ and $H_{ai}$ are equal, while for inclined blades such as 8 it is possible to choose, for example, for a latitude of 48°, $H_{ad}=78°$ and $H_{ai}=42°$. A convenient inclination of blades 8 will therefore be, for example, $x_1=35°$.

It can be noted immediately and it will become obvious later on that the regeneration of light by a system of light recovery blades 8, as rudimentary as those shown in FIGS. 2–4, is not good when the light comes from rather low elevations for example inferior to 15° and that as a consequence such a glare-shield is suitable only in the case in which the sun is masked by natural obstacles or constructions, when its apparent height with respect to blade system 8 drops below such a value. It will be noted, furthermore, that, on the one hand no reflection whatsoever can occur in the direction of a positive sight due to the presence of an absorbing surface at 85 and of masking of strip 83 for rays inferior to its normal, and that on the other hand the effect of the absorbing strip 84 is to limit the penetration of light when the apparent height of the sun is very pronounced.

FIG. 5 shows by way of example, a profile of blade 8' conceived so that it may use at the maximum the light coming from very low sights. Blades 8' differ from blades 8 shown in FIGS. 2 to 4 by the adjunction, between strip 83 and vertical surface 82, of a semireflecting surface 87 having an inclination $-x_2$ intermediate between the inclinations of strips 83 and 82 and at the superior part of the latter of a semireflecting surface 86 having an inclination $+x_3$ towards negative sights. In addition, strip 83 of blades 8' is semireflecting. The inclinations of the various plane surfaces of blade 8' may be, for example, $x_1=30°$ for the inferior face 81 and therefore $-x_1=-30°$ for strips 84 and 83, $-x_2=-10°$ for strip 87 and $x_3=+10°$ for strip 86.

The study of a glare-shield includes the determination of the orientation of the blade systems with respect to the North-South axis, the determination of their occultation angles $H_{ad}$ and $H_{ai}$ as a function of their orientation and of the latitude of the location and the determination of the inclinations to be given to the various plane strips constituting the blade faces set up in order to direct the rays reflected under optimum conditions with respect to the vertical and with respect to the axis of entrance into the tunnel or passageway to be protected. As these various parameters are largely interdependent their choice is advantageously guided by the use of graphs and nomograms examples of which are given below.

FIGS. 6 and 7 are diagrams indicating the practical definitions of the angles used hereinafter and in particular of those which serve in the establishment of the occultation characteristics, FIG. 6 relating to the case in which the number of reflections between two contiguous parallel blades 8A, 8B is even and FIG. 7 relating to the case in which the number of reflections between blades is odd for example to the case of simple reflection on one blade. Axis 41 is the axis of the roadway oriented in the direction of entrance 2 to the tunnel. Axis 42 is the North-South axis oriented towards the South and the angle between this axis and the azimuth 43 of the sun is symbolized by A'; $\psi$ is the angle between axis 42 and ground line 44 on the horizontal view of the half plan perpendicular to the superior face of blades 8A, 8B and $a$ is the angle between 42 and 41, i.e., the angle between the direction of entrance and the South. The angle $\beta$ between 44 and 43 is the projection on the horizontal plane of the angle of incidence of a light ray on the blades: $\beta = A' - \varphi$.

If $\alpha$ is taken to be the angle of the slope of the entrance hopper with respect to the horizontal plane, $\alpha$ being considered as negative if it rises towards the entrance and if it is supposed that the glare-shields follow the slope of the hopper, the condition for occultation is:

$$\frac{1}{tg\ H_a} = \frac{\cos \beta}{tg\ \{H + \text{arc } tg\ [tg\ \alpha \cdot \cos (A' - a)]\}}$$

with $H_a \leqslant H_{ad}$ in direct operation or $H_a \leqslant H_{ai}$ in inverse operation, $H_a$ being the apparent height of the sun for the blade system under consideration.

For purposes of simplification it will be assumed in the following description that the glare-shields elements are placed horizontally. The condition for occultation can then be written as:

$$\frac{1}{tg\ Ha} = \frac{\cos \beta}{tg\ H}$$

The value of $1/tg\ H_a$ defines, therefore, the maximum values of $H_{ad}$ and $H_{ai}$ for which there is occultation.

With this formula it is possible to establish, as a function of latitude, of the declination of the sun and of the hour, for a range of values of angle $\varphi$, the conditions of occultation of the sun for each system of blades.

Passages through 0 of $$\frac{\cos \beta}{tg\ H}$$

corresponding to azimuths of the sun such as $A' = \varphi \pm 90°$ i.e., to positions of the sun having an azimuth which is parallel to the horizontal generatrices of the blades. These points represent a change in the general mode of operation of the glare-shields namely from direct to reverse, or reverse to direct.

In order to define the conditions for occultation of a glare-shield with two blade systems the function $$\frac{\cos \beta_2}{tg\ H} = f\left(\frac{\cos \beta_1}{tg\ H}\right)$$

is plotted on a graph thus expressing that the conditions for occultation are met by one or the other of the two systems as shown in FIG. 8 established for two fixed blade systems characterized by angles $\varphi_1 = +10°$, $\varphi_2 = +70°$ and placed at a North latitude of 48° at the summer solstice. The indicated values for A', $A' = 80°$, and $A' = +100°$ are those for which the passage through 0 of $$\frac{\cos \beta_1}{tg\ H}$$

corresponds to a change in mode of operation of the first system and $A'=-20°$ corresponds to a change in mode of operation of the second blade system. If a fixed value of $$\frac{\cos \beta_1}{\text{tg } H}$$

is given for the first blade system which is inferior to its actual occultation limit, for example $$\frac{\cos \beta_1}{\text{tg } H}=0.2$$

it can be seen that two limiting values of $$\frac{\cos \beta_2}{\text{tg } H}$$

exist which are respectively equal to $-0.64$ and $+1.73$, one of which corresponds to direct operation, and the other to reverse operation of the second blade system for which occultation will be realized for any possible value of H.

If, on the contrary, a value is chosen for $$\frac{\cos \beta_1}{\text{tg } H}$$

which is superior to the limit of occultation of the first system for example $+0.5$ to which correspond the values for $$\frac{\cos \beta_2}{\text{tg } H}:+0.41 \text{ and } 0.77$$

the occultation does not occur in any permanent manner due to the fact that there are values of $$\frac{\cos \beta_2}{\text{tg } H}$$

which are inferior in absolute value to 0.41 for values of $$\frac{\cos \beta_1}{\text{tg } H}$$

inferior to $+0.5$.

FIG. 9 similarly shows the combined characteristic of a glare-shield with two blade systems having orientations $\varphi_1=+40°$ and $\varphi_2=-50°$. It can be seen that there is only one passage through 0 of each of the values $$\cos \beta_1/\text{tg}H$$

for $A'=+40°$ and $$\cos \beta_2/\text{tg}H$$

for $A'=-50°$. Any point of the characteristic may be chosen for the construction of the glare-shield.

The importance of such combined occultation curves for two systems of blades is to make it possible to carry out a rapid economic study based on an approximate determination of the shape of the blades. It is indeed possible to calculate the surface or the volume of the material needed for construction of the blades for each point of the characteristic and to obtain in this way the value for $$\cos \beta_1/\text{tg}H$$

corresponding to a minimum surface or volume.

The shape of the blades is determined so as to obtain a satisfactory luminance of the roadway, especially when the sun is low and therefore so as to suitably direct the reflected light without producing any dazzling effects for a user of the road travelling towards the protected entrance.

The direction of reflected rays 45 is very simply determined thanks to the convention that has been adopted relating to signs for inclinations of the various plane surfaces of each blade: the resultant reflection is the same as a simple reflection on a surface whose inclination is equal to the algebraic sum of the inclination of surfaces successively encountered by the light ray, the incident ray 43 being used directly in the case of FIG. 7 in which the number of reflections is odd, and replaced, in the case of FIG. 6 in which the number of reflections is even, by a virtual incident ray 43', symmetrical with 43 with respect to a vertical plane parallel to the blade generatrices.

FIGS. 6 and 7 similarly show angles $\epsilon$ between the direction of the reflected ray 45 and the direction opposite 46 to that of the entrance axis 41, the luminance of the road being better as angle $\epsilon$ is smaller.

It can be seen, H being the elevation of the sun and $H_r$ the height of the reflected ray, that the apparent elevations of the incident and reflected rays, i.e., their projections on a vertical plane perpendicular to blades 8A, 8B are related to these values through $$\text{tg } H_a=\frac{\text{tg } H}{\cos \beta}$$

and $$\text{tg } H_{ar}=\frac{\text{tg } Hr}{\cos \beta_r}$$

Furthermore, the apparent height $H_{ar}$ of the reflected ray is deduced from the apparent height $H_a$ of the incident ray by means of the previously defined resultant inclination $x_r$ of the unique equivalent blade, i.e., in the case of an odd number of reflections $$H_{ar}=Ha=2x_r$$

and in the case of an even number of reflections $$Har=\pi-Ha+2x_r$$

Angles $\beta_r$ and $\epsilon$ are defined by the following relationships: for an odd number of reflections $$\text{tg } \beta_r=-\text{tg } \beta \frac{\cos Ha}{\cos Har}$$

$$\epsilon=\pi+A+\beta_r-\beta \text{ or } \pi+\varphi-a+\beta_r$$

and for an even number of reflections $$\text{tg } \beta_r=\text{tg } \beta \frac{\cos Ha}{\cos Har}$$

$$\epsilon=A-(\beta_r+\beta) \text{ or } \varphi-a-\beta_r$$

Using these formulas, it is possible to set up nomographs which, for various values of resultant inclination of the blades set in a convenient range, give the values of angles $\beta_r$ and $H_r$ as a function of $\beta$ and $H_a$ and make it possible to determine rapidly the azimuth $\epsilon$ as well as the sight angle $H_r$ of the reflected rays.

By way of example, FIG. 10 gives, for various values of the azimuth $\beta$, the values of $\beta_r$ and $H_r$ as a function of the apparent height $H_a$ for a blade having an inclination $x=+30°$ The values for $\beta_r$ are given by the solid lines curves and those for $H_r$ by dotted line curves.

FIG. 10 shows that for a positive inclination, when $H_a=90°-2x$, $\beta_r=-90°$ for all values of $\beta$ and that, especially in the neighborhood of this point, the azimuth $\beta_r$ of the reflected ray increases rapidly as the azimuth $\beta$ of the incident ray increases, so that the advantages, obtained through use of a double reflection on blades having a strongly positive resultant inclination in order to regenerate light coming from low sights, are counterbalanced by a great difficulty in suitably directing the reflected rays, then, the inferior face 81 of the recovery blades is made from a diffusing material similar to that of blades 9 of the second system of FIGS. 2 to 4.

One solution which is a compromise and which is often advantageous, consists in setting the glare-shields symmetrically with respect to the axis of the roadway for example by means of two perpendicular blade systems with horizontal generatrices in which there is one recovery system perpendicular to the axis of the roadway and one distribution system with vertical plane blades as shown in FIGS. 2 to 4, the blades of the recovery system being preferably according to FIG. 5.

The reflections which may arise from the recovery blades 8' according to FIG. 5 are in double reflection:

On strips 86 and 81: $x_{r1} = +10° + 30° = 40°$
On strips 84 and 86: $x_{r2} = 0° + 30° = +30°$
On strips 83 and 86: $x_{r3} = -10° + 30° = +20°$
On strips 82 and 86: $x_{r4} = -30° + 30° = 0°$ With a simple reflection on strip 86, $x_3 = +10°$, on strip 82, $x = 0$ and on strip 87, $-x_2 = -10°$.

An examination of nomograms such as the one shown in FIG. 10 set up for various angles of reflection specified above, leads to the conclusion that for an orientation of the road included between South-East and South-West, no solar rays whatsoever can be reflected in a direction involving risks of dazzling for an observer travelling towards the entrance of the protected passageway. Nevertheless, the variations in angle $\epsilon$ are very important, especially when the elevation of the sun is low. Thus, for an apparent elevation of 15° which corresponds to real elevations varying from 15° for $\beta_1 = 0$ to 10° for $\beta_1 = \pm 50°$, $\epsilon$ varies from 180° to 0° while the elevation of the reflected rays varies from 39° to 85°.

For this reason, it is desirable that the inferior face 81 of blades 8' of FIG. 5 just as that of blades 8 of FIGS. 2 to 4 diffuse the light they may receive, either directly by reverse operation, or from the semireflecting strips 86, 82, 87 and 83 by direct operation.

Use of recovery blades with controllable inclination makes it possible to increase the sight angle of the reflected rays in reverse operation and therefore to improve the operation of the glare-shield when the sun is low. The required inclination of the blades at any given instant is a function of the azimuth and of the elevation of the incident solar rays. Nomograms such as the one on FIG. 10 make it possible to determine this inclination in order to obtain the highest possible elevation of the reflected rays so as to limit the hindrance caused by the large value of angle $\epsilon$. In addition to this advantage, such an arrangement which allows reverse operation when the sun is low, significantly improves the efficiency of the glare-shields, on the one hand, by using only simple reflections and, on the other hand, by exhibiting a large opening towards the most luminous part of the sky.

FIG. 11 shows, by way of example, a specific embodiment of such blades. Blades 11 are pivotally mounted on a foot hinge 110. One of the faces on blades 11 is planar and is divided into two strips, one superior diffusing strip 111 and one inferior absorbing strip 112. The other face is divided into two strips, one inferior absorbing strip 113 forming the back of strip 112 and of the inferior part of strip 111, and one superior semireflecting strip 114 which is inclined, for example, by 20° on strip 113. The interval between the superior extremities of strips 111 and 114 is occupied by an absorbing strip 115.

For the case in which the sun is low, a reverse operation is possible either on strip 111, or on strip 114 depending on its position. In the case of a high elevation of the sun, direct operation occurs by double reflection on blades 114 and 111 having a resultant inclination $x = +20°$.

In a second embodiment shown in FIG. 12, blades 12 are made up by an inferior part of fixed inclination equal to 30°, having a superior face 121 which is absorbing and a semireflecting inferior face 122, and by a superior part pivotally mounted on the superior extremity of the preceding one through a hinge 120 and in which both faces 123, 124 are semireflecting. The inclination of the latter faces is set in direct operation between 0° and −25° for face 123 and in reverse operation between +30° and +50° for face 124.

In order to improve the direction of the reflected rays, it is possible to use glare-shields with rotating elements.

FIG. 13 shows, similarly to FIG. 1 and with the same reference numerals for the components common to both figures, which will not be described again, a glare-shield 10 with circular rotating elements 50 placed side by side, for example in a staggered arrangement. The rotating elements 50 of glare-shield 10 are advantageously identical to one another and each one, which has a vertical axis and includes a peripheral crown 80 in which is located a set of blades 90 with parallel and horizontal rectilinear generatrices, is mounted so that it may easily be oriented around its vertical axis. For example, the rotating elements 50 are fixed through their crown 80 on individual roller tracks and are orientatable simultaneously and in a parallel direction by means of a common mechanism which is not shown.

Figure 14A:
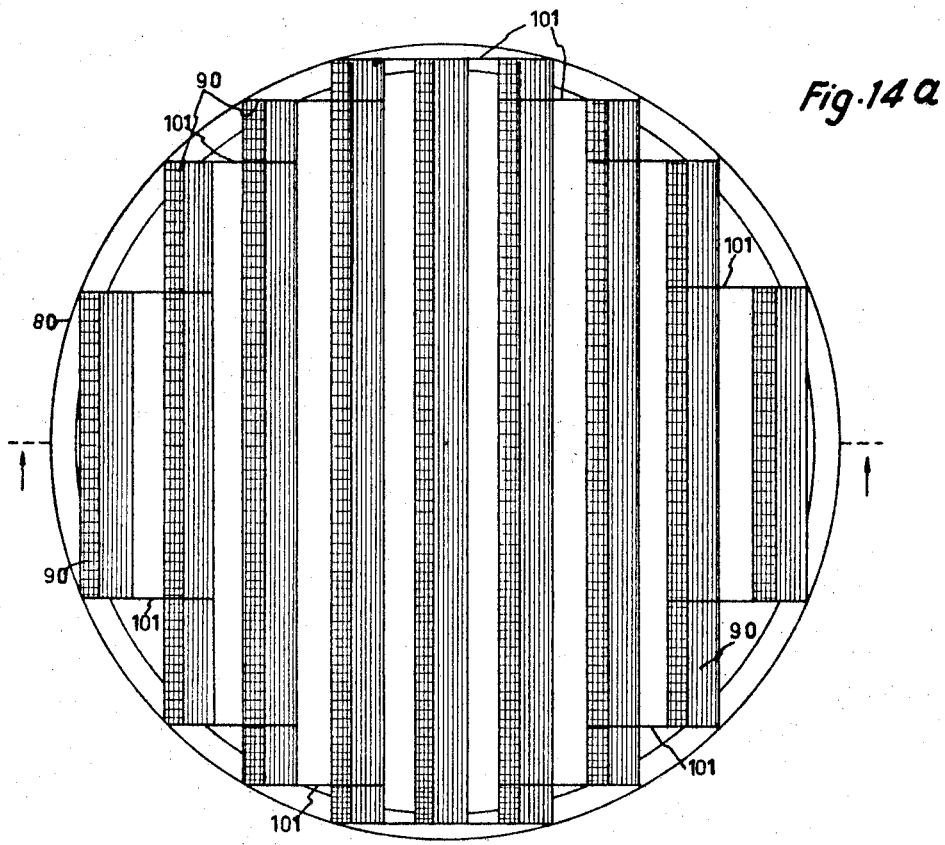
FIGS. 14a, 14b are respectively a plan view and a sectional view through a median vertical plane of a rotating glare-shield element according to the invention.
Figure 14B:
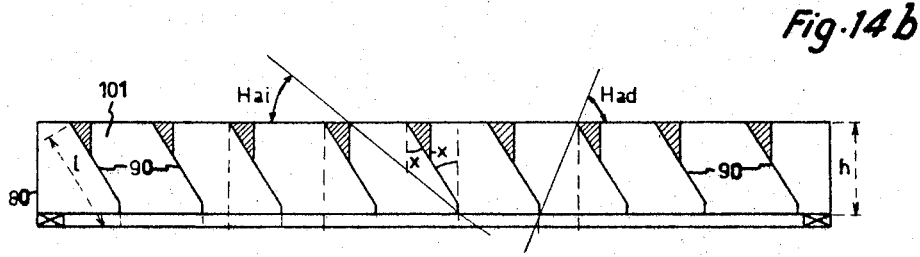

FIGS. 14a, 14b show diagrammatically, an embodiment of a rotating element 50 in which blades 90 are fixed and are shown in a simplified manner similar to blades 8 in FIGS. 2, 3, 4. The crown 80 functions as frame and a rotating support for the set of blades 90. The latter are inclined with respect to the vertical at an angle $x$ and are linked to one another through vertical end flanges 101 which, on the one hand, maintain their separation and parallelism, and, on the other hand, insure the lateral occultation necessary for a precise control of the propagation of light through the blade system.

FIG. 15 shows, by way of example, a preferred embodiment of blades 90. On the superior face of such a blade 90, a principal part is inclined with respect to the vertical at an angle $-x_1$ and divided into a semireflecting inferior strip 91, and an absorbing superior strip 92 and a superior part consists of two semireflecting recovery strips 93 and 94, having respective inclinations $-x_2$ and $-x_3$ with $|x_1| > |x_2| > |x_3|$ and for example $-x_1 = -30°$, $-x_2 = -20°$ and $-x_3 = -10°$. Similarly, on the inferior face of blade 90 whose surface is entirely semireflecting, an inferior strip 95 having an inclination $+x_1$ is in its major part, the back of strips 91, 92, and a superior strip 96 has an inclination $x_4$ with $x_4 > x_1$ and for example $x_4 = 40°$. The lower part of blades 90 is a vertical part in which both faces 97 and 98 are absorbing and the interval between the superior extremities of strips 94 and 96 is taken up by a strip 99 which is also absorbing. The latter is not horizontal but is characterized by a pronounced positive inclination with respect to the vertical so as to enhance, in reverse operation, the penetration of light coming from very low sights while at the same time forming with the bottom of the vertical absorbing strips 97, 98 of the neighboring blades, angles $H_{ad}$ and $H_{al}$ of suitable values as a function of the latitude of the location and shown as having respective values of $H_{ad} = 70°30'$ and $H_{al} = 35°45'$.

The study of a rotating glare-shield is facilitated by using nomograms such as the one shown, by way of example, in FIG. 10.

As the principal parameters of such a glare-shield are determined by means of a complete set of nomograms as stated above, it is necessary to study its luminous performance in order to define its conditions of use. This study is carried out as a function of the shape of the blades and makes it possible to set up graphs such as those in FIGS. 16 and 17a, 17b relating to a glare-shield consisting of rotating elements according to FIGS. 14a, 14b and in which the blades are as shown in FIG. 15.

Figure 16:
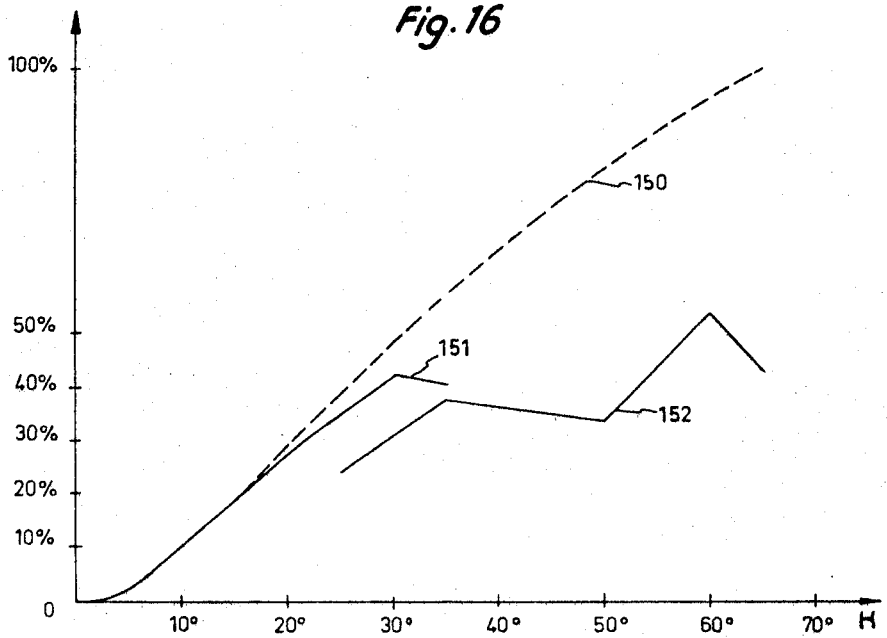
FIGS. 16 and 17a, 17b are graphs for determining the operating conditions of a rotating glare-shield equipped with blades according to FIG. 15.

FIG. 16 shows, for this specific case, the proportion of solar luminous flux used as a percentage of the maximum flux as a function of the height of the sun, angle $\beta$ being nil. It can be seen by comparing curve 151, relative to reverse operation, with the theoretical curve 150 for incoming solar luminous flux, that up to a solar height of 30° the almost complete totality of the available light is used, and according to curve 152, that in direct operation an increasing proportion of the solar luminous flux is absorbed as a function of its value, this lessening of the luminous flux coming from high sights being due principally to the absorbing strips 92.

Figure 17:
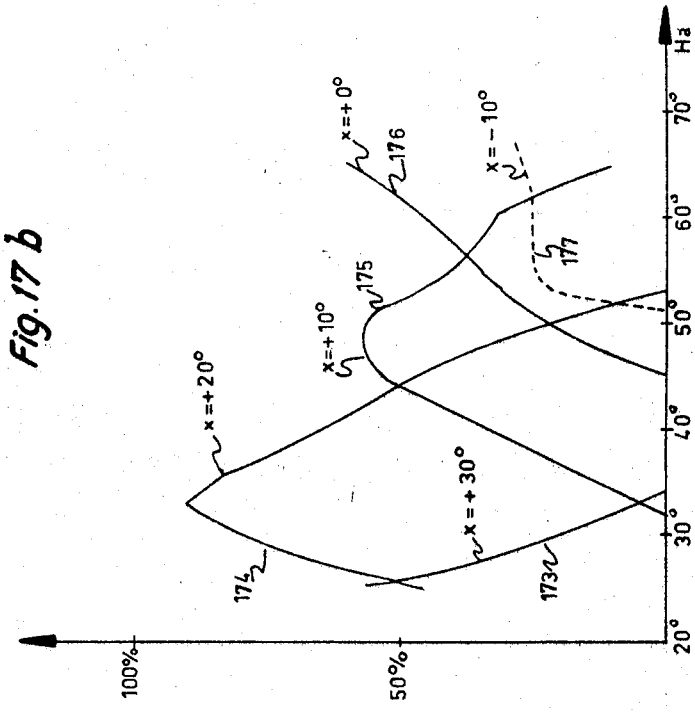
Figure 17:
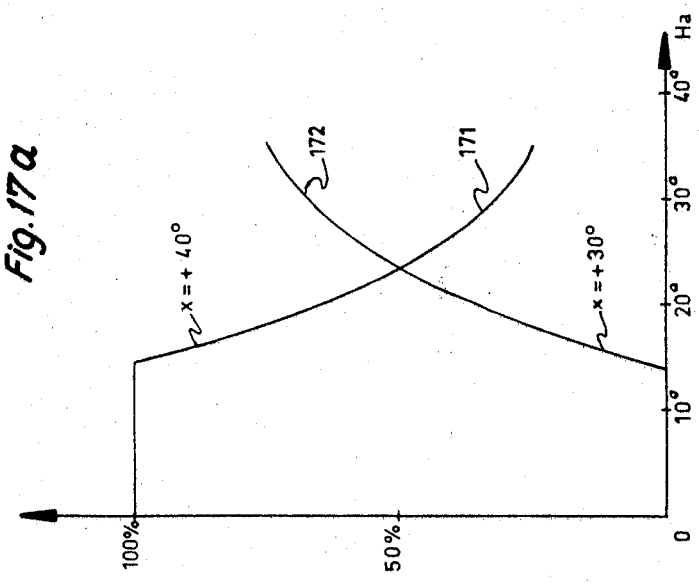

FIGS. 17a, 17b show respectively for the mode of reverse operation and for the mode of direct operation, the reflection percentages obtained for various resultant blade inclinations. Curve 171 of FIG. 17a shows that, with an odd number of reflections on the blades having an inclination such that the resultant reflection corresponds to a simple reflection on a blade of inclination $x=+40°$, and in practice for that case only, up to an apparent height $Ha$ slightly inferior to 15°, the available light is used entirely and then in a decreasing proportion and finally only 50% of it is used as $Ha$ approaches 25°, and curve 172 shows that for this value the resultant reflection corresponding to a simple reflection on a blade of inclination $x=+30°$ itself has a 50% efficiency which increases rapidly with apparent height. In FIG. 17b, curves 173, 174, 175 and 176 show the reflection percentages obtained with an even number of reflections and as practically double reflection on blades having a resultant inclination equal to 30°, 20°, 10°, and 0° respectively and curve 177 shows the same percentage for an odd number of reflections, i.e., practically as simple reflection on a blade having an inclination $x=-10°$.

The orientation that is to be given to the glare-shield, as a function of the azimuth and of the height of the sun as well as of the orientation of the entrance to be protected in order to obtain a reflection of light in a satisfactory direction, i.e., as near as possible to the axis of the roadway in the opposite direction to the entrance and at a high incidence, is determined from nomograms such as the one shown as an example in FIG. 10.

Figure 18:
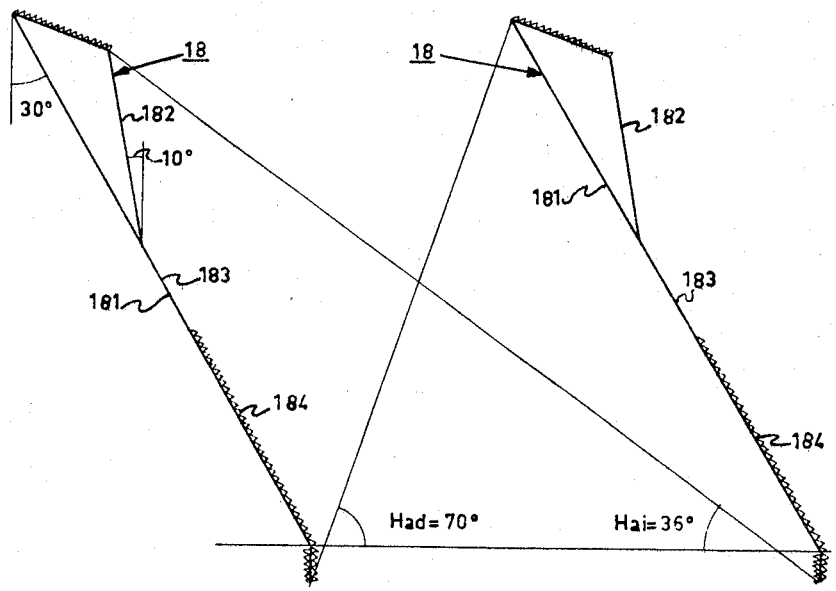
FIG. 18 is a cross sectional view, through a vertical plane, of a simplified embodiment of blades for a rotating glare-shield.

FIG. 18 shows an example of a very simplified blade 18 having occultation angles $Had=70°$ and $Hai=36°$. Reverse operation is accomplished by simple reflection on a single strip 181 having an inclination of $+30°$ and direct operation either by simple reflection on a superior strip 182 having an inclination of $-10°$ or by double reflection on the latter or on a strip 183 having an inclination of $-30°$ and on strip 181. The lower part of the superior face of the blade is an absorbing strip 184.

In order to improve still more the possibility of directing the reflected rays, it is possible to replace the fixed inclination blades of the rotating elements by variable inclination blades, such as those shown in FIGS. 11 and 12.

A particularly interesting use of such rotating glare-shields provided with tilting blades is the regularization of natural lighting in premises receiving daylight through the ceiling as frequently occurs in museum halls. In that case the glasswork of the ceiling is frosted and the glare-shields are arranged above this glasswork so as to make it possible to regulate the amount of light reaching it, by adjusting simultaneously the orientation and the inclination of the blades.

What I claim is:

1. Glare-shield for creating at the entrance of dark and artificially illuminated passageways open to automotive circulation a transition zone illuminated by diffuse reflection of the natural light, comprising at least a horizontal system of parallel blades ensuring a permanent occultation of the rays of the sun over the entire range of said zone, each of said blades exhibiting a plurality of plane surfaces with different inclinations, and said plurality of plane surfaces comprising at least one semireflecting surface, one diffusing surface and one absorbing surface whereby said system of parallel blades projects towards the roadway in preferential directions of high sights, a proportion of the incident light which is greater as the height of the sun is lower.

2. Glare-shield for creating at the entrance of dark and artificially illuminated passageways open to automotive circulation a transition zone illuminated by diffuse reflection of the natural light, comprising a first horizontal system of planar parallel blades having light diffusing vertical surfaces, and a second horizontal system of parallel blades, the blades of said first and second systems having different orientations and ensuring a permanent occultation of the rays of the sun over the entire range of said zone, each blade of said second system exhibiting a plurality of plane surfaces with different inclinations, and said plurality of plane surfaces comprising at least one semireflecting surface, one diffusing surface and one absorbing surface whereby said second system of parallel blades projects towards the roadway in preferential directions of high sights, a proportion of the incident light which is greater as the height of the sun is lower.

3. Glare-shield for creating at the entrance of dark and artificially illuminated passageways open to automotive circulation a transition zone illuminated by diffuse reflection of the natural light, comprising a plurality of axially rotatable circular elements each comprising a system of nonplanar parallel blades, each of said blades exhibiting a plurality of plane surfaces comprising at least one semireflecting surface, one diffusing surface and one absorbing surface, and means for giving to said systems of blades a parallel orientation adjustable as a function of the azimuth and of the height of the sun in order to obtain a permanent occultation of the rays of the sun over the entire range of said zone and a preferential direction of diffusion of the incident light oriented in an opposite direction from the azimuth of said entrance and whose sight is sufficiently high to avoid any dazzling effect for an observer travelling along the roadway in the direction of said entrance.

4. Glare-shield according to claim 1 in which said parallel blades are at least partially hinged on a horizontal axis so that the inclination of at least one semireflecting surface of each blade can be modified in order to improve said preferential direction of incident light diffusion and vary the transparency factor of said glare-shield.

References Cited

UNITED STATES PATENTS

| | | | |
|---|---|---|---|
| 289,537 | 12/1883 | Hyatt | 350—264 |
| 583,580 | 6/1897 | Pennycuick | 350—260 |
| 586,223 | 7/1897 | Basquin | 350—258 |
| 586,251 | 7/1897 | Soper | 350—260 |
| 721,258 | 2/1903 | Wadsworth | 350—263 |
| 1,652,347 | 12/1927 | Champeau | 350—259 |

FOREIGN PATENTS

| | | |
|---|---|---|
| 1,354,676 | 1/1964 | France. |

JULIA A. COINER, *Primary Examiner.*

U.S. Cl. X.R.

350—259